United States Patent [19]

Dispas

[11] Patent Number: 4,676,451
[45] Date of Patent: Jun. 30, 1987

[54] DUAL BRAKE ADJUSTMENTS FOR FISHING REELS

[75] Inventor: Jean P. Dispas, Alleur, Belgium

[73] Assignee: Fabrique National, Herstal, Belgium

[21] Appl. No.: 794,763

[22] Filed: Nov. 4, 1985

[30] Foreign Application Priority Data

Nov. 9, 1984 [BE] Belgium .................................. 60541
Mar. 29, 1985 [BE] Belgium .................................. 60656

[51] Int. Cl.⁴ ........................................... H01K 89/02
[52] U.S. Cl. ............................................... 242/84.5 A
[58] Field of Search ..................... 242/84.5 A, 84.5 P, 242/84.51 P, 84.2 A

[56] References Cited

U.S. PATENT DOCUMENTS

| | | | |
|---|---|---|---|
| 2,932,464 | 4/1960 | Mauborgne | 242/84.5 P |
| 2,988,298 | 6/1961 | Purnell | 242/84.2 A |
| 3,255,981 | 6/1966 | Wood, Jr. | 242/84.5 A |
| 4,470,554 | 9/1984 | Kobayashi et al. | 242/84.5 P |
| 4,529,142 | 7/1985 | Yoshikawa | 242/84.5 A |

*Primary Examiner*—Billy S. Taylor
*Attorney, Agent, or Firm*—Bacon & Thomas

[57] ABSTRACT

The spool shaft of a spinning-type fishing reel is provided with a friction brake. The brake has plural disks axially biased against a stationary housing part by a spring to normally hold the spool shaft from rotating except upon an application of force applied against the spool, e.g. by a fish, beyond desired level. The force of the spring determining the brake force is adjusted by turning a knob at the rear of the reel. However, this adjustment can be modified by a second brake adjustment in the form of a manually operated level which enables the angler to control instantaneously the unwinding of the spool independently of the first brake adjustment. The second brake adjustment may act through mechanical linkage or a combination of linkage and a fluid system.

10 Claims, 3 Drawing Figures

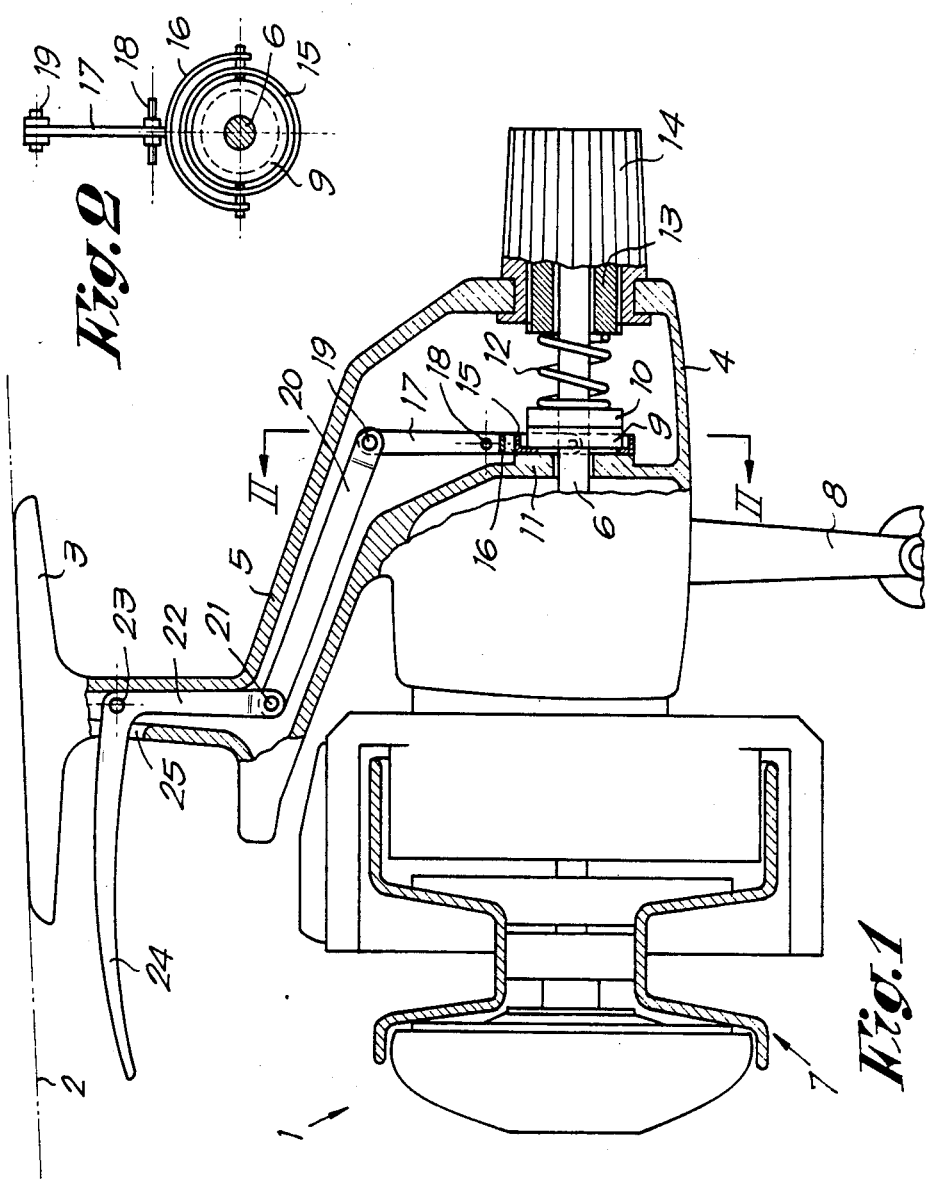

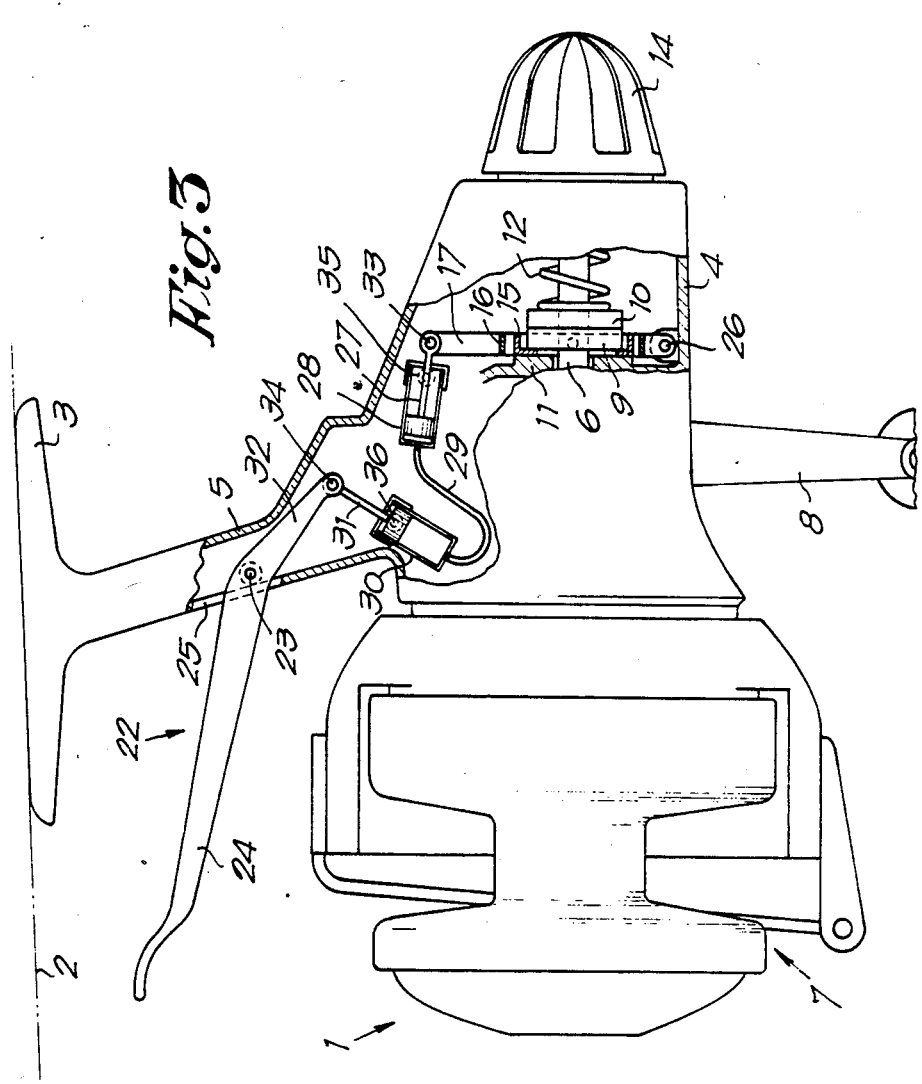

DUAL BRAKE ADJUSTMENTS FOR FISHING REELS

The invention concerns improvements to braked reels for fishing rods, more specifically reels of the type featuring a drum mounted on a shaft that can be driven by means of a crank handle, said shaft being provided with a braking mechanism with adjustable effect on the shaft.

This adjustment can be influenced in two ways on the known braked reels.

The first means of adjustment consists substantially of a knob mounted on the end of said shaft directed towards the angler, and inside the casing of the braked reel, simultaneously mobile in rotation and longitudinally to enable the angler to exert thrust on said braking mechanism through the action of a compression spring, and thereby to adjust the braking of said drum progressively.

The second means of adjustment of said braked reel drums at present on the market consists substantively of a lever located adjacent to the rod itself so that it can be operated by the angler without having to relinquish his hold on the rod. Said lever acts directly on said braking mechanism through the action of a lever and rod, to enable the angler to control instantaneously the unwinding of said drum independently of said first means of adjustment.

However, this second means of adjustment, although popular with anglers, has turned out to be too abrupt, causing, among other problems, the risk of snapping the fishing line.

The improvements claimed in the invention concern more specifically the second means of adjustment, seeking to avoid an abrupt adjustment, and to ensure a fully progressive adjustment.

For this purpose, these improvements, as applied to braked reels for fishing rods, of the type featuring a drum mounted on a shaft that can be driven by means of a crank handle, in which the shaft is provided with a first braking mechanism consisting of pairs of discs held between a fixed part of the casing and a compression spring on which a pressure control device acts, and a second braking mechanism consisting of a lever arm linked to a lever that can influence said discs, are characterised by the fact that the action of said lever on said discs is opposed to the action of said spring on said discs.

With the aim of bringing out more clearly the characteristics of the invention, two embodiments are described below, as examples without being in any way limiting, with references to the appended drawings, in which:

FIG. 1 represents schematically and in longitudinal section a braked reel to which the improvements claimed in the invention have been applied;

FIG. 2 represents a section along the line II—II in FIG. 1;

FIG. 3 represents, also schematically and in longitudinal section, an alternate of FIG. 1.

In the example shown in FIGS. 1 and 2, the reel 1 is intended for attachment to a fishing rod with an intermediate support 3.

The support is connected to the reel casing 4 by a hollow elbow section 5.

The casing 4 carries the shaft 6, to which the line reel 7 is attached.

The rotating components of the braked reel can be driven in rotation by means of a crank handle 8.

The aforesaid first means of brake adjustment is represented schematically in this embodiment by two brake discs, 9 and 10 respectively, which are so fitted to the shaft 6 that one of the discs, for example disc 9, may be keyed or spline mounted on shaft 6 and is longitudinally mobile but cannot rotate, while disc 10 is so mounted as to be simultaneously longitudinally mobile and rotatable.

The disc 9 is adjacent to a fixed part 11 of the casing and the disc 10 is subject to the thrust of spring 12, the opposite end of which is influenced by the inner part 13 of the knob 14.

This part 13 can be moved longitudinally in any manner by rotating knob 14 to exert a variable force on the spring 12.

According to the present improvements, a thrust part, a ring 15 in this case, is inserted between the said fixed part 11 and the disc 9. A fork 16 is attached to the free end of a lever 17 acts upon this ring. The lever can swivel about a pin 18, and its free end is connected, by a hinge pin 19, to a rod 20, the opposite end of which is connected, by means of a hinge pin 21, to an elbow lever 22, which is itself articulated about a hinge pin.

The arm 24 of said lever 22 protrudes from the hollow part 5 of the casing 4 through an opening 25.

It can be seen from the drawings that the ring 15 is moved towards the discs 9, 10 by action on said arm 24, to cause braking of the shaft 6, and line reel 7 respectively.

According to the invention, this braking force, which is generated by friction between the discs 9, 10, increases progressively due to the fact that the action of the ring 15 on the discs 9, 10 is opposed to the action of the spring 12 on the discs 9, 10.

It is thus ensured that the aforesaid second means of brake adjustment, due to its progressive nature, prevents the braking force from snapping the line.

The alternate shown in FIG. 3 concerns the control of the disc 9 by the lever 17, which is articulated about a pin 26, and is acted upon by the mobile part 27 of a hydraulic cylinder 28 connected by means of a pipe 29 to a second hydraulic cylinder 30, the mobile part 31 of which can be acted upon by the free end 32 of the arm 33 of the lever 22.

The mobile parts, respectively 27 and 31, are connected to levers, respectively 17 and 22, by hinge pins, respectively 33 and 34, while the hydraulic cylinders themselves 28 and 30 are connected to the casing 4 of the reel by hinge pins, respectively 35 and 36.

The invention is in no way limited to the embodiments described above and illustrated in the drawings; on the contrary, improvements of all forms and dimensions can be constructed without going beyond the terms of the invention.

What is claimed is:

1. An improved braked reel assembly for a fishing rod, which assembly comprises:
   (a) a casing including a fixed portion;
   (b) a shaft;
   (c) a reel mounted on the shaft for supporting a line;
   (d) a braking mechanism;
   (e) a first brake adjustment means including at least two discs supported on the shaft, one disc being longitudinally movable but nonrotatable and the other disc being longitudinally movable and rotatable with respect to the shaft, and a compression spring for urging the discs towards the fixed portion of the casing;

(f) control means for varying the pressure imparted by the compression spring against the discs; and (g) a second brake adjustment means including a lever arm for urging the discs away from the fixed portion of the casing and in direction towards increased compression of the spring.

2. The assembly of claim 1 further including a lever carried by the lever arm, the lever including a free end disposed between the fixed portion of the casing and the discs.

3. The assembly of claim 2 further including a ring carried by the free end of the lever for engaging the longitudinally movable but nonrotatable disc.

4. The assembly of claim 3 further including a fork for attaching the ring to the free end of the lever.

5. The assembly of claim 4 further including a swivel pin and the free end of the lever being mounted for articulated movement about the pin.

6. The assembly of claim 2 further including a swivel pin and the free end of the lever being mounted for articulated movement about the pin.

7. The assembly of claim 2 further including an elbow rod carried by the lever arm, an elongated rod, the opposite ends of the elongate rod being pivotally connected to the elbow rod and the lever arm.

8. The assembly of claim 2 further including a fluid piston and cylinder assembly connecting the lever arm and the lever for permitting actuation of the lever by the lever arm.

9. The assembly of claim 8 wherein the fluid piston and cylinder assembly includes a pair of cylinders, a piston disposed in each cylinder, one piston being connected to the lever arm and the other piston being connected to the lever, and the cylinders being in fluid communication with each other.

10. The assembly of claim 9 wherein the cylinders are each pivotally connected to the casing and the piston rods include free ends pivotally connected to the lever arm and lever.

* * * * *